United States Patent [19]

Kulas et al.

[11] Patent Number: 5,513,941
[45] Date of Patent: May 7, 1996

[54] ROLLING CARGO APPARATUS

[76] Inventors: Kenneth K. Kulas; Arthur R. Nelson, Jr.; Jesse G. Draughon, all of 801 Westmoreland La., Cantonment, Fla. 32533

[21] Appl. No.: 391,194

[22] Filed: Feb. 21, 1995

[51] Int. Cl.$^6$ .................................................. B60P 1/00
[52] U.S. Cl. .............................. 414/522; 211/151; 296/26
[58] Field of Search .......................... 414/522, 537, 414/538; 296/26; 224/42.44, 310, 281; 211/151

[56] References Cited

U.S. PATENT DOCUMENTS

| | | | |
|---|---|---|---|
| 2,284,419 | 5/1942 | Greig | 296/26 |
| 2,852,303 | 9/1958 | Hopson | 414/522 X |
| 3,004,790 | 10/1961 | Mayer | 414/522 X |
| 3,132,755 | 5/1964 | Greenslate | 414/522 |
| 3,768,673 | 10/1973 | Nydam et al. | 414/522 |
| 4,303,367 | 12/1981 | Bott | 414/522 |
| 4,305,695 | 12/1981 | Zachrich | 414/522 |
| 4,681,360 | 7/1987 | Peters et al. | 414/522 X |
| 4,681,371 | 7/1987 | Leonard | 414/522 X |
| 4,685,857 | 8/1987 | Goeser et al. | 414/522 |
| 4,824,158 | 4/1989 | Peters et al. | 414/522 X |
| 4,950,123 | 8/1990 | Brockhaus | 414/522 |
| 4,993,088 | 2/1991 | Chudik | 414/522 X |
| 5,046,913 | 9/1991 | Domek et al. | 414/522 |
| 5,052,878 | 10/1991 | Brockhaus | 414/522 |

FOREIGN PATENT DOCUMENTS

| | | | |
|---|---|---|---|
| 2579146 | 9/1986 | France | 414/522 |

*Primary Examiner*—David A. Bucci
*Attorney, Agent, or Firm*—George A. Bode

[57] ABSTRACT

This invention pertains to cargo transportation, and more particularly to an apparatus that facilitates loading and unloading of cargo from a vehicle. In accordance with the present invention, a retractable bed for vehicles is provided that is simple in design, can be adapted to different vehicle applications and has greater safety and cargo carrying capacity than prior devices. In addition, the invention can be installed or removed by a single user because of it's light weight and efficient design. The apparatus comprises a load carrying transport system having improved structural properties and arrangements for rollably supporting the cargo. The cargo is supported on a rolling deck that is rollably attached to a frame assemble by roller bearings. The frame assemble is mounted to the truck bed. The rolling deck moves along the roller bearings on the frame assembly to move the load.

3 Claims, 8 Drawing Sheets

ROLLING CARGO APPARATUS

BACKGROUND

This invention pertains to cargo transportation, and more particularly to an apparatus that facilitates loading and unloading of cargo from a vehicle. It is well known in the art to install retractable platforms on the beds of trucks to support and move the truck cargo. However, the prior art devices are unnecessarily complex, and therefore are not practical for varying applications.

U.S. Pat. No. 5,052,878 and 4,950,123, both issued to Brockhaus, describe retractable truck beds involving telescoping cargo supports that are unnecessarily complicated. Other examples of such structures may be seen in U.S. Pat. Nos. 4,305,695, 4,303,367 and 4,268,213.

A primary difficulty in designing and constructing such platforms is obtaining sufficient cargo carrying capacity and travel from light weight materials while maintaining design simplicity. Platform designs should incorporate greater structural strength and rigidity such that platforms are self supporting. This design criteria eliminates the need for vertical support when the platform is extended and allows that platforms of varying sizes for different applications can be manufactured at a relatively inexpensive cost.

It is important that the platform is light weight, so that a single user can install and remove the platform without the need of assistance. Furthermore, improved means for locking the platform frame in place on the vehicle is also desirable. Thus, a need exists for improvements in retractable truck beds.

SUMMARY

The present invention is directed to an apparatus that satisfies this need. In accordance with the present invention, a retractable bed for trucks is provided that has greater safety and cargo carrying capacity than prior devices. The apparatus comprises a load carrying transport system having improved structural properties and arrangements for rollably supporting the cargo. The embodiment of the invention provides for a light weight cargo transport apparatus that can be easily installed and removed by a single user. The efficient design of the invention eliminates the need for a vertical support when tile apparatus is in the extended position.

The cargo is supported on a rolling deck that is rollably attached to a frame assembly by roller bearings. The frame assembly can be removably mounted to the truck bed by a single user. The rolling deck moves along the roller bearings on the frame assembly to transport the cargo load. The rolling deck moves longitudinally in relation to the frame assembly between a retracted position and an extended position. When the rolling deck is fully extended, it is supported by means of a roller bearing attached to the bottom of the rolling deck that rides the underside of the center support of the frame assembly. This roller bearing arrangement provides for vertical stability of the rolling deck and eliminates the need for a vertical support when the rolling deck is extended. The lateral movement of the rolling deck is restrained by the side rails of the frame assembly which extend above the lower surface of the rolling deck.

In addition the preferred embodiment of the invention includes a positive locking mechanism that prohibits vertical and longitudinal movement of the rolling deck whether loaded or empty. The positive locking mechanism comprises a spring loaded lever including a nipple that selectively engages openings in the side rails of the rolling deck. The rolling deck can be selectably locked in various extended positions, thereby providing stability of the rolling-deck for loading and unloading cargo. Moreover the locking mechanism insures that the preferred embodiment of the invention can be used safely.

These and other features, aspects, and advantages of the present invention will become better understood with reference to the following description and appended claims.

DRAWINGS

These and other features, aspects, and advantages of the present invention will become better understood with regard to the following description, appended claims, and accompanied drawings where:

DESCRIPTION

Figure 1:
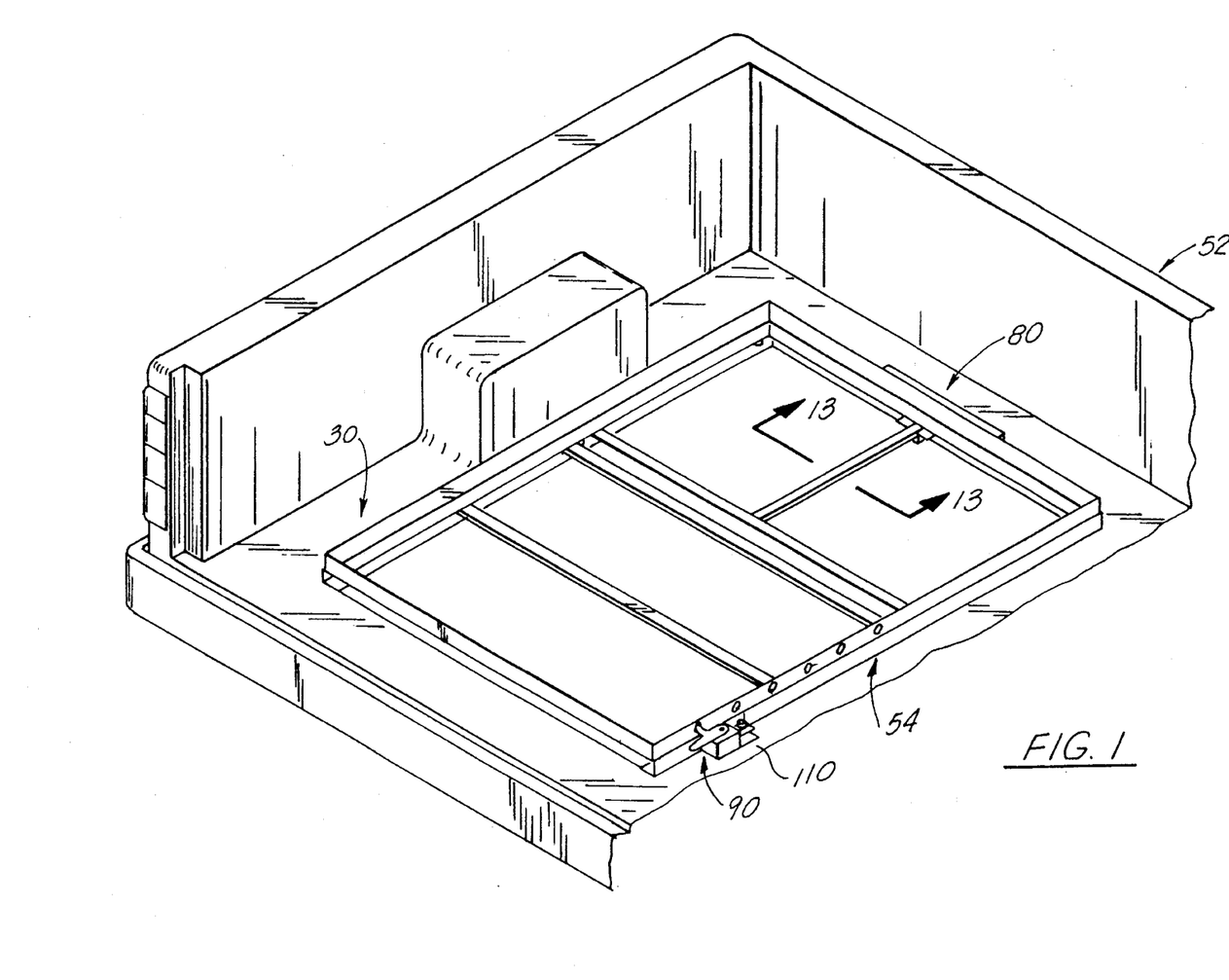
FIG. 1 shows the embodiment of the invention mounted on the truck bed in the retracted position.
Figure 2:
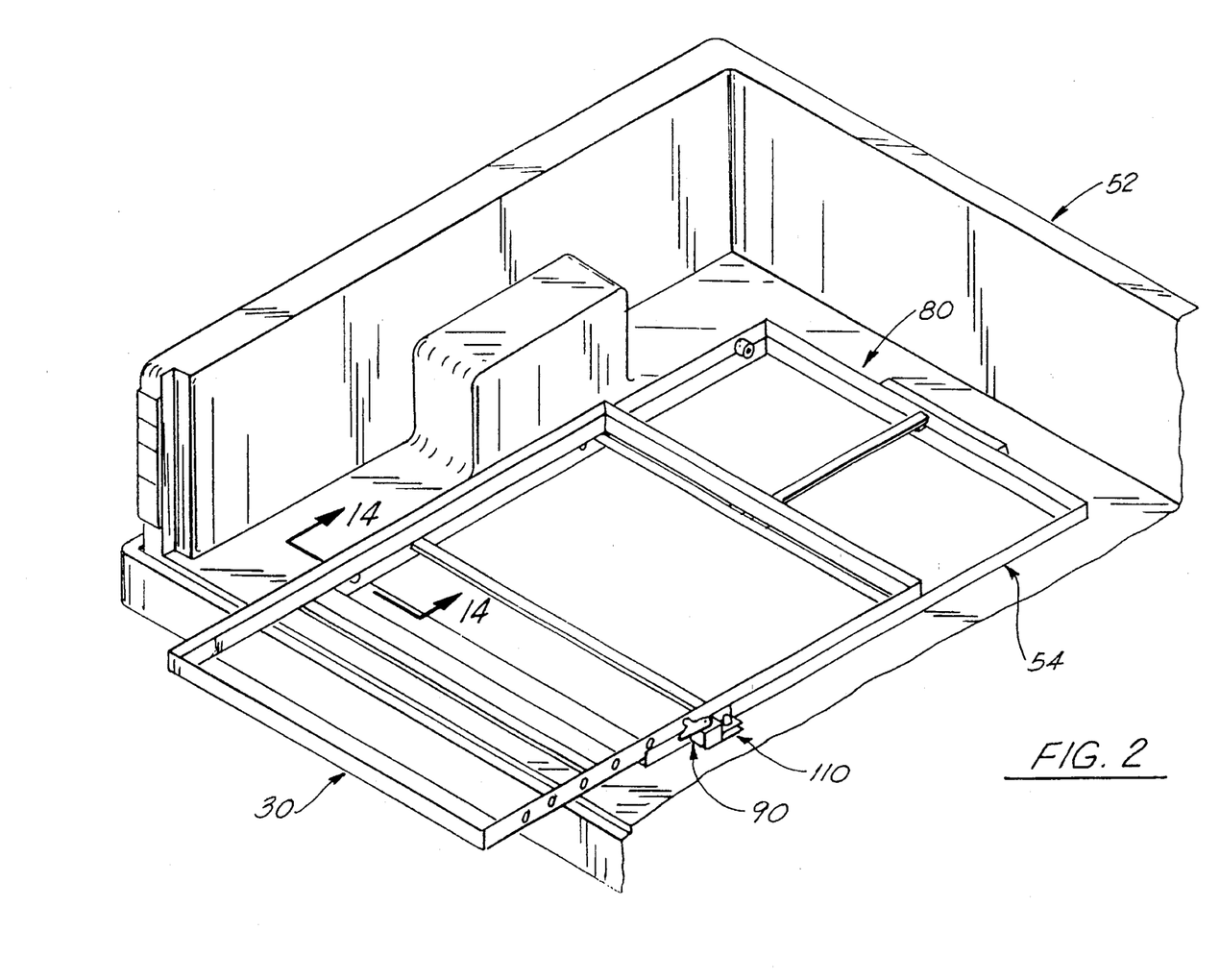
FIG. 2 shows the embodiment of the invention mounted on the truck bed in the extended position.

As shown in FIG. 1 and FIG. 2, a cargo carrier apparatus comprises a rolling deck 30, a base frame 54, slide mount 80, hasp mounts 110 and a locking mechanism 90. The base frame 54 is removably attached to a vehicle bed 52 by slide mount 80 and hasp mounts 110. The rolling deck 30 is rollably mounted on base frame 54 depending on ball bearings 70a–f and needle bearing 44. A locking mechanism 90 is attached to base frame 54 and selectively engages rolling deck 30 to secure the position of rolling deck 30 relative to base frame 54.

As shown in FIGS. 3, 4, 5, and 6, base frame 54 comprises first side member 56, second side member 58, first end member 60, second end member 62, lateral member 64 and guide-member 66. First side member 56, second side member 58, first end member 60 and lateral member 64 have L-shaped cross-sections, typical for angle iron or angle brace configurations: first side member 56 comprises horizontal surface 56a and vertical surface 56b, second side member 58 comprises horizontal surface 58a and vertical surface 58b, first end member 60 comprises horizontal surface 60a and vertical surface 60b and lateral member 64 comprises horizontal surface 64a and vertical surface 64b. Second end member 62 and guide member 66 have cross sections typical for steel bar or sheet-metal configurations.

Figures 3, 4, 5:
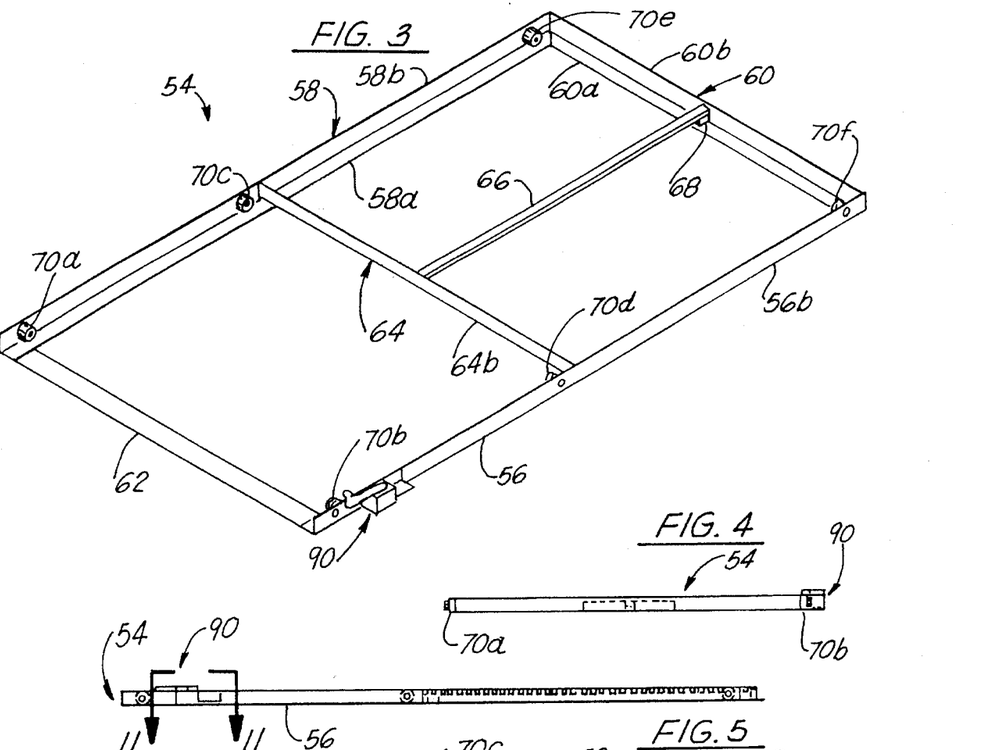
FIG. 3 is a perspective view of base frame 54.
FIG. 4 shows a front elevational view of base frame 54.
FIG. 5 shows a side elevational view of base frame 54 of the embodiment of the invention.
Figure 6:
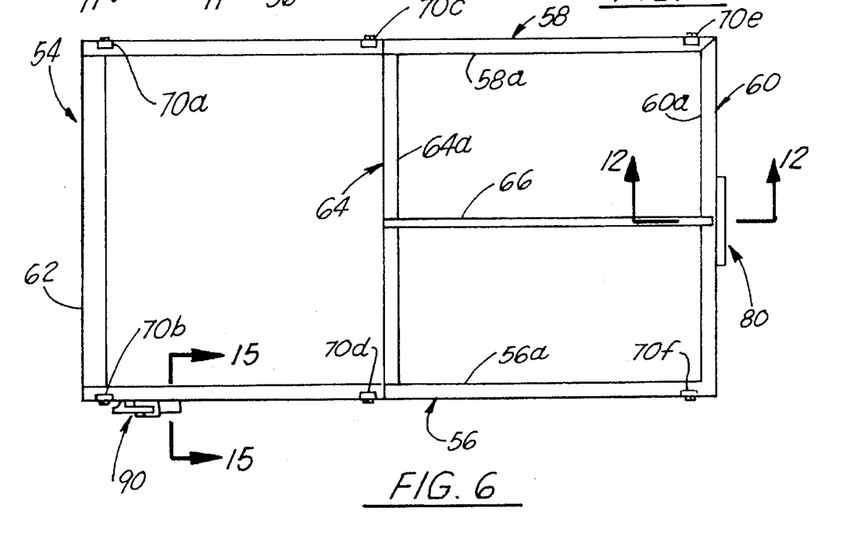
FIG. 6 shows a top plan view of base frame 54 of the embodiment of the invention.
Figure 12:
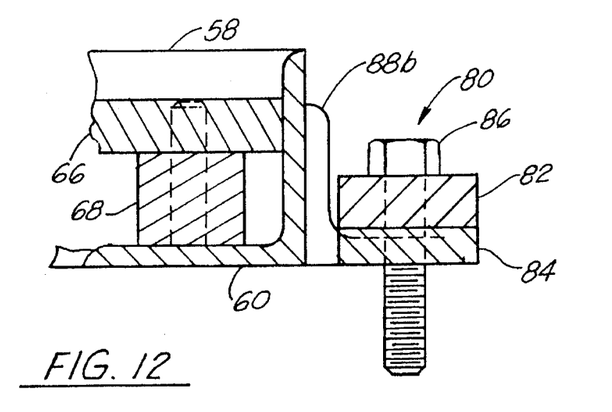
FIG. 12 is a cross-sectional view at line 12—12 of the embodiment of the invention.

As shown in FIGS. 3 and 6, first side member 56 and second side member 58 are attached to first end member 60, and second end member 62 to form a rectangle, opposing sides and ends being parallel. The L-shaped cross-sections of first side member 56, second side member 58, and first end member 60, have a common orientation facing the interior of the rectangular shape of base frame 54. Thus, horizontal surface 56a, horizontal surface 58a, and horizontal surface 60a lie in the same horizontal plane. Vertical surface 56b and vertical surface 58b lie in parallel vertical planes and vertical surface 60b lies in a vertical plane perpendicular to the planes of surfaces 56b and 58b. Second end member 62, having no vertical surface, lies in the same horizontal plane as horizontal surfaces 56a, 58a, and 60a. Lateral member 64 is attached between first side member 56 and second side member 58 and is perpendicular to said side members. Horizontal surface 64a lies in tile same horizontal plane as horizontal surfaces 56a, 58a, and 60a. Guide-member 66 is attached between vertical surface 60b of first end member 60 and vertical surface 64b of lateral member 64 and is positioned parallel to first and second side members 56 and 58 and perpendicular to first end member 60 and lateral member 64. As shown in FIG. 12, guide member 66 is elevated above the horizontal surface 60a of first end member 60 and horizontal surface 64b of lateral member 64 by spacer blocks 68.

Figure 14:
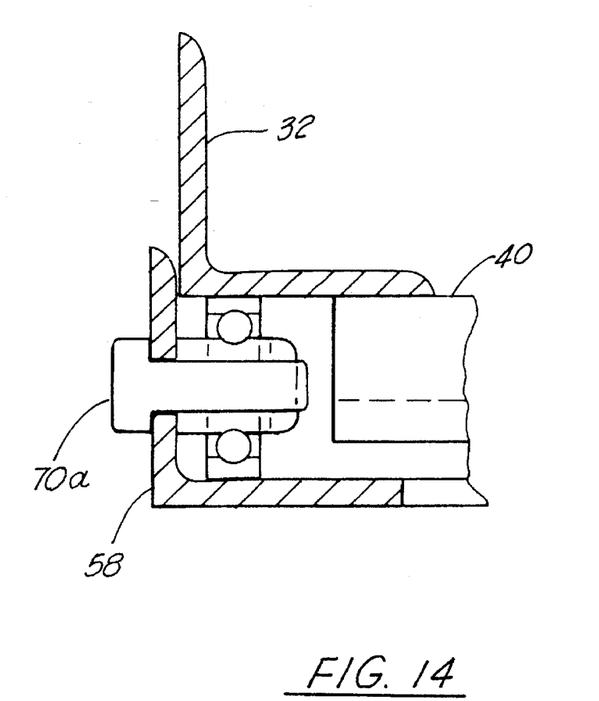
FIG. 14 is a cross-sectional view at line 14—14 of the embodiment of the invention.
Figure 15:
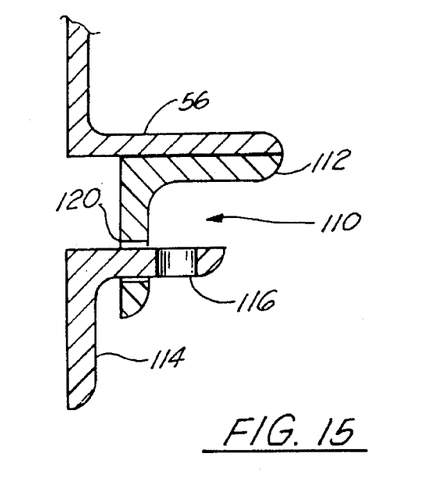
FIG. 15 is a cross-sectional view at line 15—15 of the embodiment of the invention.
Figure 16:
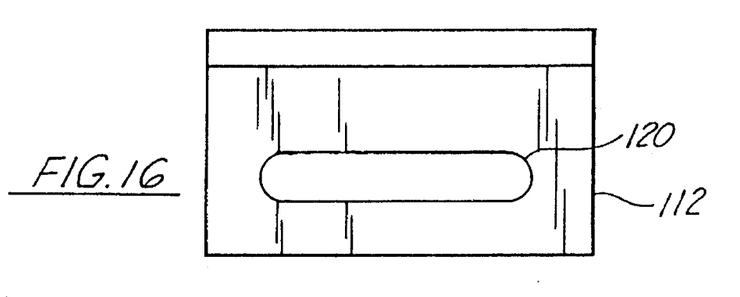
FIG. 16 is a top plan view of hasp 112 of the embodiment of the invention.
Figure 17:
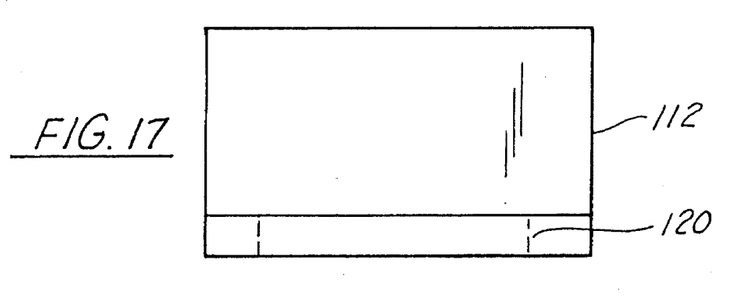
FIG. 17 is an elevational view of hasp 112 of the embodiment of the invention.
Figure 18:
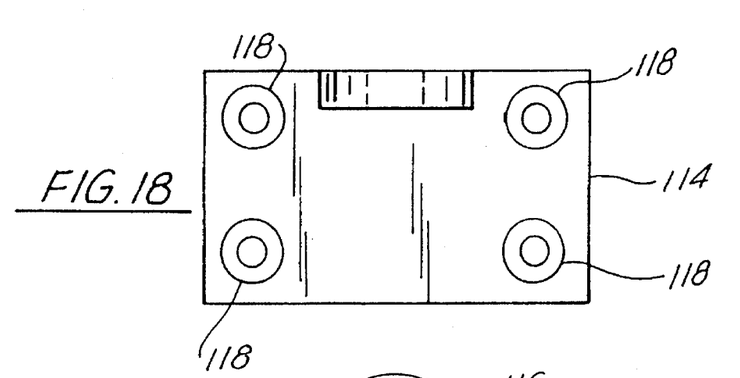
FIG. 18 is a top plan view of lock plate 114 of the embodiment of the invention.
Figure 19:
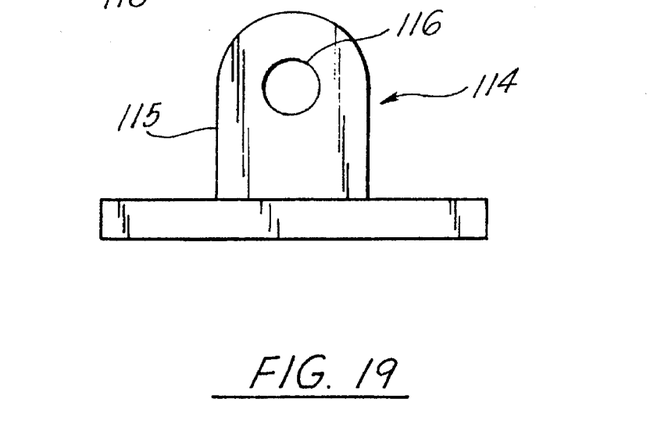
FIG. 19 is an elevational view of lock plate 114 of the embodiment of the invention; and, FIG. 20 is an exploded perspective view of slide mount 80 of the embodiment of the invention.

As shown in FIG. 6, roller bearings 70a, 70c and 70e are attached to vertical surface 58b at the middle and opposing ends of the second side member 58. Roller bearings 70b, 70d, and 70f are attached to vertical surface 56b at the middle and opposing ends of first side member 56. As shown in FIG. 14, roller bearing 70a is positioned on and attached to vertical surface 58b such that roller bearing 70a can rotate free of interference of horizontal surface 58: this arrangement is typical for roller bearings 70b, 70c, 70d, 70e and 70f.

Base frame 54 is removably attached to vehicle bed 52 by slide mount 80 and hasp mounts 110. Slide mount 80 primarily restricts vertical movement of the base frame 54 and hasp mounts 110 primarily restrict lateral and longitudinal movement.

Figure 20:
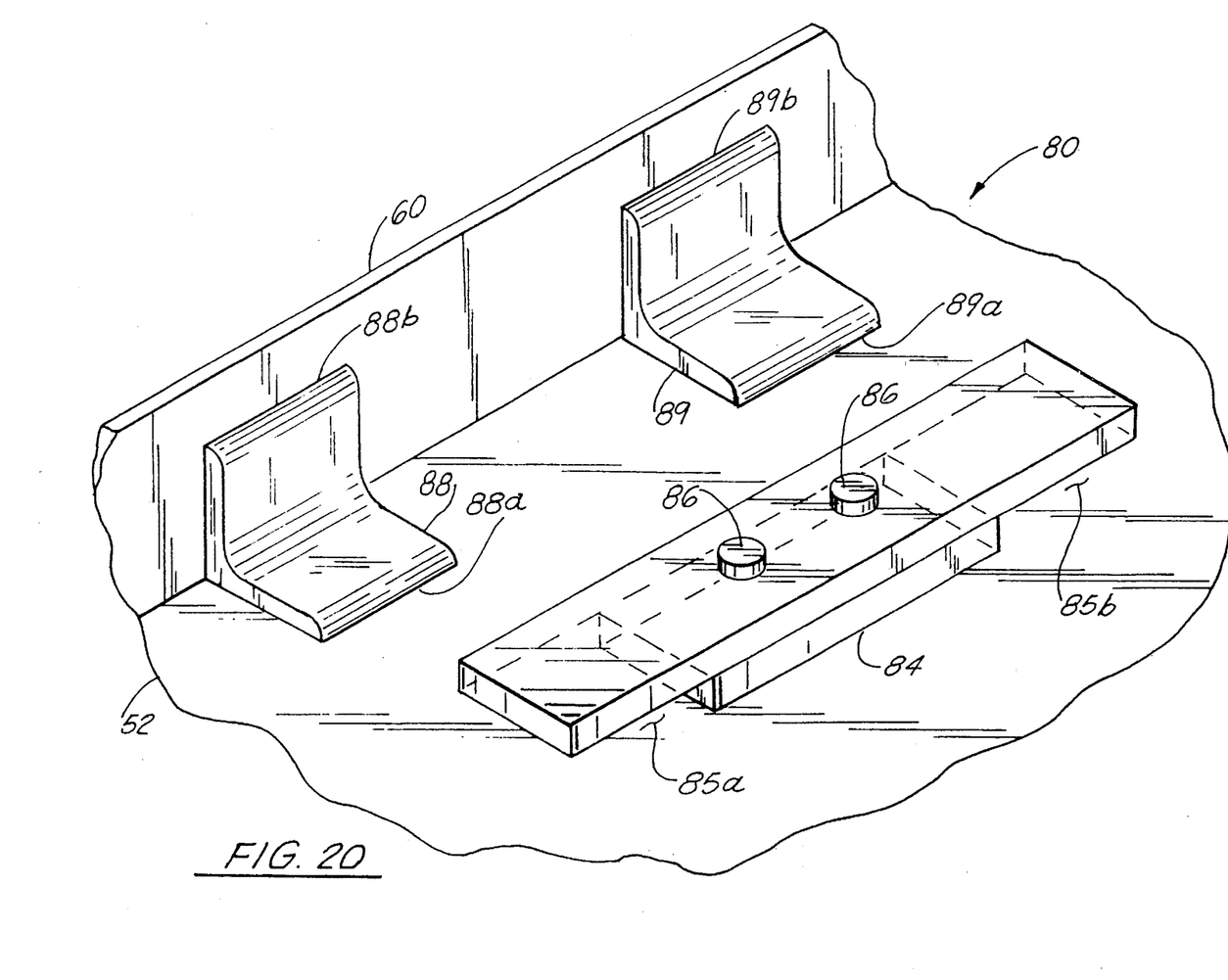

As shown in FIGS. 12 and 20, slide mount 80 comprises mount support 82, mount spacer 84, mount fasteners 86, and mount brackets 88 and 89. Mount support 82 is centered over mount spacer 84 and both are attached to vehicle bed 52 by mount fasteners 86. Because mount support 82 is greater in length than mount spacer 84, typically twice as long, recesses 85a and 85b are formed underneath the terminal ends of mount support 82. Mount brackets 88 and 89 have L- shaped cross-sections including horizontal surfaces 88a and 89a and vertical surfaces 88b and 89b. Vertical surfaces 88b and 89b are attached to vertical surface 60b such that horizontal surfaces 88a and 89a lie in the horizontal plane defined by horizontal surfaces 56a, 58a, and 60a. Mount brackets 88 and 89 are spaced apart such that horizontal surfaces 88a and 89a are positioned to engage recesses 85a and 85b. Thus, mount brackets 88 and 89 slidably engage mount support 82 and prevent base frame 54 from lifting off of the vehicle bed 52 when a torque or vertical load is applied to the base frame 54.

As shown in FIGS. 15, 16, 17, 18 and 19, hasp mounts 110 comprise hasps 112 and lock plates 114. Hasps 112 are mounted to vertical surfaces 56b and 58b. Lock plates 114 are attached to vehicle bed 52. Hasps 110 have slots 120 for receiving eyelets 115 in lock plates 114. Once hasps 112 have fully engaged lock plates 114, fasteners are used to secure hasp mounts 110 and thus, restrict the lateral and longitudinal movement of base frame 54.

As shown in FIGS. 7,8,9 and 10, rolling deck 30 comprises first side member 32, second side member 34, first end member 36, second end member 38, first lateral member 40, second lateral member 42 and needle bearing 44. First side member 32, second side member 34, first end member 36 and second end member 38 have L-shaped cross-sections, typical for angle iron or angle brace configurations: first side member 32 comprises horizontal surface 32a and vertical surface 32b, second side member 34 comprises horizontal surface 34a and vertical surface 34b, first end member 36 comprises horizontal surface 36a and vertical surface 36b and second end member 38 comprises horizontal surface 38a and vertical surface 38b. Lateral member 40 and 42 have a V-shaped cross section for supporting a vertical and lateral load.

Figure 7:
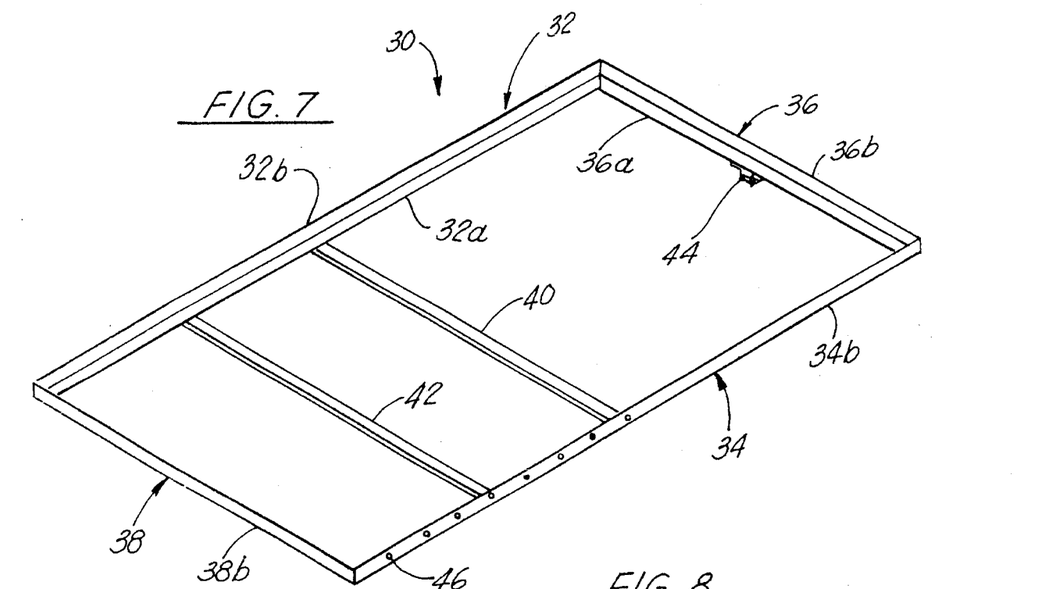
FIG. 7 shows a perspective view of rolling deck 30 of the embodiment of the invention.
Figures 8, 9:
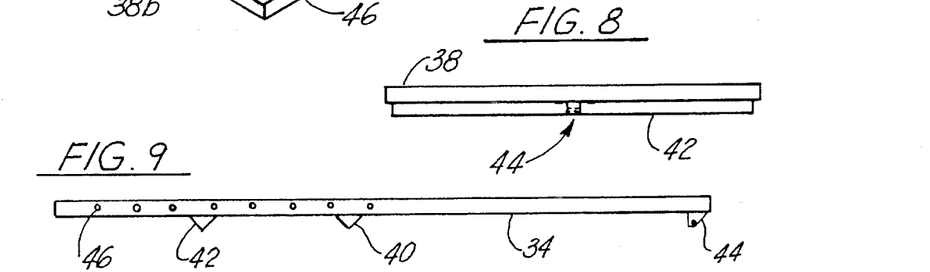
FIG. 8 shows a front elevation view of rolling deck 30 of the embodiment of the invention.
FIG. 9 shows a side elevational view of rolling deck 30 of the embodiment of the invention.
Figure 10:
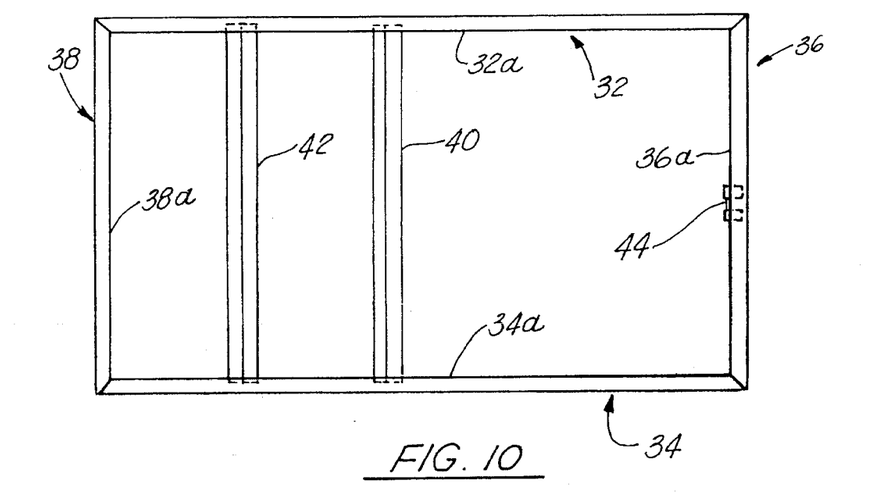
FIG. 10 shows a top plan view of rolling deck 30 of the embodiment of the invention.
Figure 13:
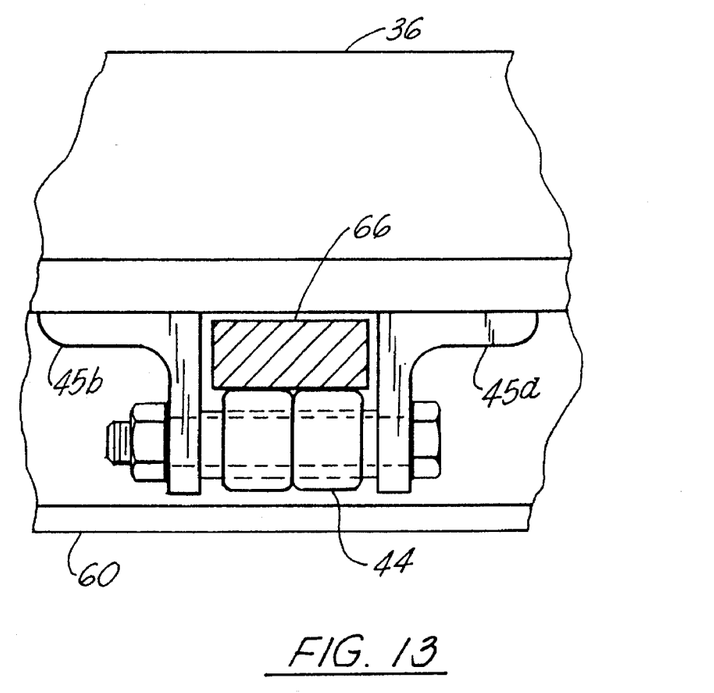
FIG. 13 is a cross-sectional view at line 13—13 of the embodiment of the invention.

As shown in FIGS. 7 and 10, first side member 32 and second side member 34 are attached to first end member 36 and second end member 38 to form a rectangle, opposing sides and ends being parallel. The L-shaped cross-sections of first side member 32, second side member 34, first end member 36, and second end member 38 have a common orientation facing the interior of the rectangular shape of rolling deck 30. Thus, horizontal surface 32a, horizontal surface 34a, horizontal surface 36a and horizontal surface 38a all lie in the same horizontal plane. Vertical surface 32b and vertical surface 34b lie in parallel vertical planes and vertical surface 36b and vertical surface 38b lie in parallel vertical planes perpendicular to the planes of surfaces 56b and 58b. First lateral member 40 and second lateral member 42 are attached between first side member 32 and second side member 34 in a perpendicular orientation at equal spacing from second end member 38. As shown in FIGS. 7, 10 and 13 needle bearing 44 is attached at the midpoint of first end member 36 on the bottom surface of horizontal surface 36a by brackets 45a and 45b. As shown in FIG. 13, brackets 45a and 45b position needle bearing 44 such that guide member 66 passes between horizontal surface 36a and needle bearing 44. Second side member 34 has eight holes 46 located in vertical surface 34b, holes 46 being spaced equally apart and adjacent the terminal end of second side member 34 connected to second end member 38.

The lateral movement of rolling deck 30 is restrained by vertical surface 56b and vertical surface 58b of base frame 54 which extend above the upper edge of vertical surface 32b and vertical surface 34b of rolling deck.

Figure 11:
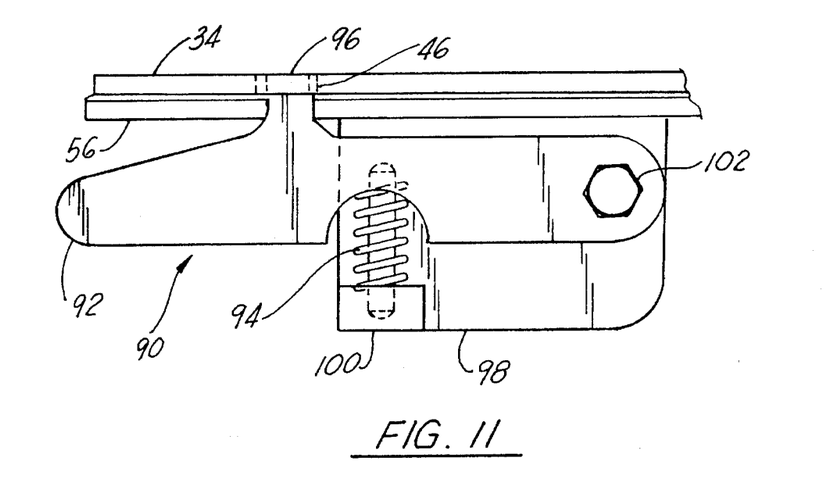
FIG. 11 is a cross-sectional view at line 11—11 of the embodiment of the invention.

As shown in FIG. 11, locking mechanism 90 comprises lever 92, spring 94, lever nipple 96, support 98, spring block 100 and fastener 102. Support 98 is attached to vertical surface 56b adjacent to the terminal end of side member 56 attached to second end member 62. Lever 92 is rotatably attached to support 98 by fastener 102. Spring 94 is positioned between spring block 100 and lever 92 such that spring 94 applies a load to lever 92 and forces lever nipple 96 to engage horizontal surface 34b of rolling deck 30. Depending upon the position of rolling deck 30 relative to base frame 54, lever nipple 96 selectively engages holes 46 in vertical surface 34b.

What is claimed is:

1. A cargo transportation apparatus, comprising;
  a) a base frame attached to a support surface;
  b) slide mount means, attached to said base frame and said support surface, for slidably attaching said base frame to said support surface, whereby the vertical movement of said base frame is restricted;
  c) at least two hasp mount means, attached to said base frame and said support surface, for removably attaching said base frame to said support surface, whereby the lateral and longitudinal movement of said base frame is restricted;
  d) at least four roller bearings attached to said base frame;
  e) a rolling cargo frame, mounted on said roller bearings;
  f) at least one guide roller bearing, attached to said rolling cargo frame;
  g) at least one guide bar means, attached to said base frame, for supporting said guide roller bearing, whereby said guide bar means supports an upward vertical load from said guide roller bearing; and
  h) at least one locking means, attached to said base frame, for securing said rolling cargo frame, whereby said rolling cargo frame can be secured in different positions relative to said base frame.

2. A cargo transportation apparatus, comprising;
  a) a base frame attached to a support surface, having first and second opposing parallel end members, a first side member attached to said end members, a second side member having holes located therein, opposing and parallel to said first side member and a lateral member attached perpendicularly to said side members;
  b) slide mount means, having at least one bracket attached to said base frame and at least one support mount attached to said support surface, for slidably attaching said base frame to said support surface, whereby the vertical movement of said base frame is restricted;
  c) at least two hasp mount means, having at least one hasp attached to said base frame and at least one eyelet bracket attached to said support surface, for removably attaching said base frame to said support surface, whereby the lateral and longitudinal movement of said base frame is restricted;
  d) at least four roller bearings attached to said base frame;
  e) a rolling cargo frame, mounted on said roller bearings;
  f) at least one guide roller bearing, attached to said rolling cargo frame;
  g) at least one guide bar means, attached to said base frame, for supporting said guide roller bearing, whereby said guide bar means supports an upward vertical load from said guide roller bearing and controls longitudinal movement of said rolling cargo frame; and
  h) at least one locking means having a spring loaded lever and lever nipple, attached to said base frame, for securing said rolling cargo frame, whereby said lever nipple selectively engages said holes in said second side member and said rolling cargo frame can be secured in different positions relative to said base frame.

3. A cargo transportation apparatus as recited in claim 2, further comprising a cargo containing means, attached to said base frame, for containing the cargo transported by said rolling cargo frame.

\* \* \* \* \*